United States Patent [19]
Brown et al.

[11] Patent Number: 5,089,040
[45] Date of Patent: Feb. 18, 1992

[54] IRON COMPLEX SYNTHESIS

[75] Inventors: Roger A. Brown, Chino Hills; Donald C. Young, Fullerton; Alex E. Miller, Placentia, all of Calif.

[73] Assignee: Union Oil Company of California, Los Angeles, Calif.

[21] Appl. No.: 315,519

[22] Filed: Feb. 24, 1989

[51] Int. Cl.$^5$ .................. C05D 9/00; C05D 9/02; C01G 49/14
[52] U.S. Cl. .................. 71/63; 71/DIG. 2; 423/558; 423/DIG. 2
[58] Field of Search ............ 71/DIG. 2, 63; 423/558, 423/DIG. 2

[56] References Cited

U.S. PATENT DOCUMENTS

| | | | |
|---|---|---|---|
| 2,905,533 | 9/1959 | Webb | 423/558 |
| 3,347,787 | 10/1967 | Rhodes | 423/DIG. 2 |
| 3,679,377 | 7/1972 | Young | 23/315 |
| 3,753,675 | 8/1973 | Young | 71/1 |

FOREIGN PATENT DOCUMENTS

| | | | |
|---|---|---|---|
| 71741 | 8/1975 | Australia | 423/558 |
| 215222 | 9/1986 | Japan | 423/558 |

*Primary Examiner*—Wayne A. Langel
*Attorney, Agent, or Firm*—Gregory F. Wirzbicki; Shlomo R. Frieman

[57] ABSTRACT

Water-soluble iron complexes are produced by forming an aqueous reaction medium (a) comprising a sulfate source (e.g., ferric sulfate) and a ferric source (e.g., the ferric sulfate and a different ferric salt) and (b) having a pH and sulfate ion to ferric ion molar ratio sufficient to form the water-soluble iron complexes. Preferably, the molar ratio of sulfate ion to ferric ion in the reaction medium is about 0.5:1 to about 1.5:1. It is also preferred that the pH of the reaction medium be about 1 to about 3.

36 Claims, No Drawings

IRON COMPLEX SYNTHESIS

BACKGROUND

The present invention relates to the synthesis of soluble iron complexes.

U.S. Pat. No. 3,679,377 and U.S. Pat. No. 3,753,675 disclose ammonium, alkali metal, and alkaline earth metal salts of iron complexes of the formulas $[Fe_2(SO_4)_2(OH)_3(H_2O)_5]^{-1}$ and $[Fe_2(SO_4)_3(OH)_2(H_2O)_5]^{-2}$ and methods for their production. These iron complex salts are agronomically effective sources of iron. Unfortunately, the methods disclosed in U.S. Pat. No. 3,679,377 and U.S. Pat. No. 3,753,675 release nitrogen oxides (an air pollutant), waste nitrogen (a nutrient), require heating and cooling of a reaction mixture, and are time consuming.

SUMMARY OF THE INVENTION

The present invention provides a method for preparing iron complexes and salts of iron complexes that does not release nitrogen oxide, does not waste nitrogen, does not require heating or cooling of a reaction mixture, and is not time consuming. The method comprises the step of reacting a ferric source with a sulfate source in an aqueous reaction medium at a pH and molar ratio of $SO_4^{-2}$ to $Fe^{+3}$ sufficient to produce the water-soluble iron complex. Preferably, the molar ratio of $SO_4^{-2}$ to $Fe^{+3}$ in the reaction medium is about 0.5:1 to about 1.5:1. It is also preferred that the pH of the reaction medium be adjusted to about 1 to about 3.

DETAILED DESCRIPTION OF THE INVENTION

In accordance with the present invention, a ferric source and a sulfate source are reacted in an aqueous reaction medium at a sufficient pH and a sufficient molar ratio of $SO_4^{-2}$ to form water-soluble iron complexes. The sulfate source preferably contains $Fe^{+3}$, but can be devoid of $Fe^{+3}$. A preferred sulfate source is ferric sulfate and a preferred ferric source is the ferric sulfate in combination with a different ferric salt.

In one version of the invention, the reaction medium is formed by combining a ferric sulfate solution and a solution of a different ferric salt. Generally, the ferric sulfate solution contains about 25 weight percent to about saturation, and preferably from about 30 to about 40 weight percent, ferric sulfate. The ferric salt solution usually contains about 50 weight percent to about saturation, and preferably about 70 to about 80 weight percent, ferric salt.

Substantially any ferric salt whose anion moiety is a weaker ligand than sulfate can be employed in the process of the instant invention. In other words, the anion moiety of the ferric salt must bond coordinately less strongly than sulfate to the ferric ion. Typically, the ferric salt has the formula $FeX_3$, wherein X is an anion that is a weaker ligand than sulfate. Exemplary anions X include, but are not limited to, halides and nitrate. The preferred halide is chloride. Since nitrate is also an important plant nutrient, X is preferably nitrate.

The molar ratio of $SO_4^{-2}$ to $Fe^{+3}$ is preferably about 0.5:1 to about 1.5:1, more preferably about 0.9:1 to about 1.1:1, and most preferably about 1:1. To achieve these $SO_4^{-2}$ to $Fe^{+3}$ ratios, the $SO_4^{-2}$ source can be ferric sulfate alone or a mixture of ferric sulfate and another sulfate containing compound, e.g., magnesium sulfate, manganese sulfate, copper sulfate, potassium sulfate, and sodium sulfate.

The pH of the reaction medium is preferably adjusted to ensure the formation of a water-soluble iron complex. In some versions of the invention, the reaction medium's initial pH is above about 3 or below about 1. In these versions of the invention, it is preferred to adjust the reaction mixture's pH to about 1 to about 3. The reason for this preference is that below about pH 1, the iron complex tends to disappear with the simultaneous appearance of free, soluble ferric ions. Free ferric ions are not agronomically effective because they readily become fixed and immobilized by the soil. In addition, a moderate application of a reaction medium having pH below about 1 may detrimentally affect foliage and soil. Above about pH 3, the ferric ion tends to precipitate as ferric hydroxide, an agronomically ineffective water-insoluble composition. More preferably, the reaction mixture's pH is adjusted between about 1 and about 2.

The pH-adjusting agent is preferably added, with stirring, to the reaction mixture at a rate slow enough to avoid the formation of ferric hydroxide precipitate. However, if any ferric hydroxide precipitate forms, the precipitate can be dissolved by simply continuing to stir the reaction medium after all the pH-adjusting agent has been added.

The agent used to adjust pH generally has a pH greater than about 3, and usually greater than about 7. Exemplary pH-adjusting agents include solutions of basic, hydroxide-containing compounds and solutions of basic, oxide-containing compounds. These basic, hydroxidecontaining compounds and basic, oxide-containing compounds & pH-adjusting agents typically have the formula $Y_mZ_n$, wherein Y is a cation, Z is selected from the group consisting of hydroxyl and oxide, and n and m are each 1 or 2. When Y and Z are both monovalent or both divalent ions, then m and n are both 1. When either Y or Z is a monovalent ion and the other is a divalent ion, then the monovalent ion's subscript is 2 and the divalent ion's subscript is 1. Ammonium, alkali metals, alkaline earth metals, and transition metals are illustrative cations Y. Generally, Y is selected from the group consisting of sodium, potassium, lithium, zinc, copper, magnesium, manganese, and ammonium. A preferred pH-adjusting agent is an aqueous ammonium hydroxide solution.

Optionally, an agricultural nutrient is employed in the process of the instant invention. Exemplary agricultural nutrients include ammonium nitrate, potassium nitrate, micronutrient containing compounds (e.g., zinc, copper, magnesium, and cobalt containing compounds), and mixtures thereof. It is also preferred that the agricultural nutrients be employed in the form of aqueous solutions.

The agricultural nutrient can be combined in several ways with the ferric sulfate and the ferric salt. For example, a solution of agricultural nutrient can be added to a reaction vessel simultaneously with either the ferric sulfate solution and/or ferric salt or can be added to the reaction medium after the ferric sulfate and ferric salt solutions have been combined. When the agricultural nutrient is ammonium nitrate, it is preferred to first combine an ammonium nitrate solution with a ferric sulfate solution in a reaction vessel and then add a ferric salt solution to the combined solutions in the vessel. In this embodiment of the invention, the reaction medium is the combined aqueous portions of the ammonium nitrate, ferric sulfate, and ferric salt solutions.

Although other additives can be present in the aqueous reaction medium, it is preferred that the aqueous reation medium consist essentially of only water, the ferric source, the sulfate source, the pH-adjusting agent, and the agricultural nutrient. It is also preferred that the sulfate source be substantially devoid of cations other than $Fe^{+3}$. In fact, the reaction medium is preferably substantially devoid of dissolved cations other than $Fe^{+3}$, $H^+$, and the cation moieties of the pH-adjusting agent and the agricultural nutrient. For example, when the agricultural nutrient is ammonium nitrate and the pH-adjusting agent is ammonium hydroxide, $Fe^{+3}$, $H^+$, and $NH_4^+$ are substantially the only dissolved cations in the reaction medium.

The reaction can be conducted at ambient temperature and pressure. Typical ambient temperatures range from about 32° F. to about 100° F. The procedure of the instant invention does not require the heating or cooling of either the reaction mixture or any ingredient employed in conducting the synthesis. In addition, the reaction can be expeditiously conducted. Typically, the time required to conduct the reaction takes less than about 2 hours, and preferably less than about 1 hour, per 10,000 pounds of product.

The water-soluble iron complexes prepared by the method of the instant invention are substantially identical to the water-soluble iron complexes prepared by the processes of U.S. Pat. No. 3,679,377 and U.S. Pat. No. 3,753,675. Accordingly, the water-soluble iron complexes prepared in accordance with the instant invention are also agronomically effective sources of iron.

In addition to being time efficient and not requiring the application or removal of heat to or from the reaction mixture or any ingredient employed therein, the procedure of the instant invention neither produces nitrogen oxides nor wastes nitrogen. Unlike the processes of U.S. Pat. No. 3,679,377 and U.S. Pat. No. 3,753,675 which use ammonium nitrate as an oxidizing agent to oxidize iron from the ferrous state to the ferric state with the release of an equivalent amount of nitrogen oxide and/or nitrogen, the process of the present invention is designed so that the water-soluble iron complexes are formed substantially without any ferrous iron being oxidized and, therefore, substantially without forming any nitrogen oxide or nitrogen. The instant invention is able to accomplish this result because the reaction medium wherein the iron complexes are formed is substantially devoid of ferrous ions. The reaction medium is substantially devoid of ferrous ions because substantially all of the iron added to the reaction medium is added in the form of ferric ions.

EXAMPLE I

Iron Complex Synthesis

Into a mixing tank was placed, with stirring, about 4,720 pounds of a ferric sulfate solution (about 36.9 weight percent $Fe_2(SO_4)_3$ or, in terms of $Fe^{+3}$, about 10.3 weight percent $Fe^{+3}$). To the ferric sulfate solution was added, with stirring, about 4,520 pounds of an ammonium nitrate solution (about 57.1 weight percent $NH_4NO_3$ or, in terms of nitrogen, about 20 weight percent nitrogen). Next, about 2,320 pounds of a ferric nitrate solution (about 76.0 weight percent $Fe(NO_3)_3 \cdot 9 H_2O$ or, in terms of $Fe^{+3}$, about 10.5 weight percent $Fe^{+3}$) was added to the mixing tank. The synthesis of the iron complex was finished by slowly adding about 270 pounds of an ammonium hydroxide solution (about 25 weight percent ammonia) to the reaction medium in the mixing tank. An exotherm of about 10° F. ensued after the addition of the aqueous ammonia and raised the temperature of the reaction medium to about 69° F. The total reaction time was about 2 hours and the ratio of $SO_4^{-2}$ to $Fe^{+3}$ was about 1:1. The absorption spectrum (visible region) sample of the final reaction medium was determined against a reference solution of about 31 weight percent $NH_4NO_3$ and showed an absorbance maximum at about 335 nm ($\epsilon = 2.06 \times 10^3$).

The absorption spectra of the iron complexes prepared in the above example are substantially identical to the absorption spectra obtained when samples prepared by the processes of U.S. Pat. No. 3,679,377 and U.S. Pat. No. 3,753,675 were analyzed. Accordingly, the iron complexes prepared by an exemplary process within the scope of the instant invention are substantially identical to those prepared in accordance with U.S. Pat. No. 3,679,377 and U.S. Pat. No. 3,753,675.

Although the present invention has been described in considerable detail with reference to certain preferred versions thereof, other versions are possible. For example, the pH of the final reaction mixture can be modified by initially adjusting the pH of one of the reactants. Therefore, the spirit and scope of the appended claims should not necessarily be limited to the description of the preferred versions contained herein.

What is claimed is:

1. A method for producing a water-soluble iron complex, the method comprising the step of reacting a ferric source with a sulfate source in an aqueous reaction medium substantially devoid of ferrous ions, the reaction medium having a pH and $SO_4^{-2}$ to $Fe^{+3}$ molar ratio sufficient to produce the water-soluble iron complex.

2. The method of claim 1 wherein the pH of the reaction medium is about 1 to about 3.

3. The method of claim 1 wherein the pH of the reaction medium is about 1 to about 2.

4. The method of claim 1 wherein the sulfate source is ferric sulfate.

5. The method of claim 1 wherein the ferric source is ferric sulfate and a different ferric salt.

6. The method of claim 5 wherein the different ferric salt has the formula $FeX_3$, X being an anion that is a weaker ligand than sulfate.

7. The method of claim 6 wherein X is selected from the group consisting of nitrate and halide.

8. The method of claim 5 wherein the different ferric salt is ferric nitrate.

9. The method of claim 1 wherein the molar ratio of $SO_4^{-2}$ to $Fe^{+3}$ in the reaction medium is about 0.5:1 to about 1.5:1.

10. The method of claim 1 wherein the molar ratio of $SO_4^{-2}$ to $Fe^{+3}$ in the reaction medium is about 0.9:1 to about 1.1:1.

11. The method of claim 1 wherein the pH of the reaction medium is about 1 to about 3, the sulfate source is ferric sulfate, the ferric source is the ferric sulfate and a different ferric salt having the formula $FeX_3$, X being an anion that is a weaker ligand than sulfate, and the molar ratio of $SO_4^{-2}$ to $Fe^{+3}$ in the reaction medium is about 0.5:1 to about 1.5:1.

12. The method of claim 11 wherein the pH of the reaction medium about 1 to about 2, the different ferric salt is ferric nitrate, and the molar ratio of $SO_4^{-2}$ to $Fe^{+3}$ in the reaction medium is about 0.9:1 to about 1.1:1.

13. The method of claim 1 further comprising the step of adjusting the pH of the reaction medium with a pH-adjusting agent having a pH greater than about 3.

14. The method of claim 13 wherein the pH-adjusting agent has a pH greater than about 7.

15. The method of claim 14 wherein the pH-adjusting agent is selected from the group consisting of solutions of basic, hydroxide containing compounds and solutions of basic, oxide containing compounds.

16. The method of claim 15 wherein the basic, hydroxide containing compounds and basic, oxide containing compounds have the formula $Y_mZ_n$, Y being a cation, Z being selected from the group consisting of hydroxyl and oxide, and m and n each being 1 or 2.

17. The method of claim 16 wherein Y is selected from the group consisting of ammonium, alkali metals, alkaline earth metals, and transition metals.

18. The method of claim 16 wherein Y is selected from the group consisting of sodium, potassium, lithium, zinc, copper, magnesium, manganese, and ammonium.

19. The method of claim 15 wherein the pH-adjusting agent is an aqueous ammonium hydroxide solution.

20. The method of claim 1 further comprising the step of adjusting the pH of the reaction medium to about 1 to about 3 with a pH-adjusting agent having the formula $Y_mZ_n$, Y being a cation, Z being selected from the group consisting of hydroxyl and oxide and m and n each being 1 or 2, and wherein the sulfate source is ferric sulfate, the ferric source is the ferric sulfate and a different ferric salt having the formula $FeX_3$, X being an anion that is a weaker ligand than sulfate, and the molar ratio of $SO_4^{-2}$ to $Fe^{+3}$ in the reaction medium is about 0.5:1 to about 1.5:1.

21. The method of claim 20 wherein the pH of the reaction medium is adjusted to about 1 to about 2 with ammonium hydroxide, the different ferric salt is ferric nitrate, and the molar ratio of $SO_4^{-2}$ to $Fe^{+3}$ in the reaction medium is about 0.9:1 to about 1:1.

22. The method of claim 1 further comprising the step of introducing an agricultural nutrient into the reaction medium.

23. The method of claim 22 wherein the agricultural nutrient is selected from the the group consisting of ammonium nitrate, potassium nitrate, micronutrient containing compounds, and mixtures thereof.

24. A method for producing a water-soluble iron complex, the method comprising the steps of:

(a) adding ferric sulfate and an agricultural nutrient to a vessel to form an aqueous reaction medium; and (b) introducing a different ferric salt into the reaction medium to form a modified medium, wherein the pH and the $SO_4^{-2}$ to $Fe^{+3}$ molar ratio of the modified medium are sufficient to produce the water-soluble iron complex substantially without forming any nitrogen oxide.

25. The method of claim 24 wherein the agricultural nutrient is ammonium nitrate.

26. The method of claim 24 wherein the different ferric salt is ferric nitrate.

27. The method of claim 24 further comprising the step of adjusting the pH of the modified medium with a pH-adjusting agent.

28. The method of claim 27 wherein the pH-adjusting agent is selected from the group consisting of solutions of basic, hydroxide containing compounds and solutions of basic, oxide containing compounds.

29. The method of claim 28 wherein the pH-adjusting agent is an ammonium hydroxide solution.

30. The method of claim 24 further comprising the step of adjusting the pH of the reaction medium with a pH-adjusting agent.

31. The method of claim 27 wherein the agricultural nutrient is ammonium nitrate, the different ferric salt is ferric nitrate, and the pH-adjusting agent is an ammonium hydroxide solution.

32. The method of claim 24 further comprising the step of adjusting the $SO_4^{-2}$ to $Fe^{+3}$ molar ratio of the reaction medium.

33. The method of claim 32 wherein the $SO_4^{-2}$ to $Fe^{+3}$ molar ratio of the reaction medium is adjusted with a different sulfate containing compound.

34. The method of claim 24 further comprising the step of adjusting the $SO_4^{-2}$ to $Fe^{+3}$ molar ratio of the modified medium.

35. A method for producing a water-soluble iron complex, the method comprising the step of reacting $SO_4^{-2}$ with iron in the form of $Fe^{+3}$ in an aqueous reaction medium at a pH and $SO_4^{-2}$ to $Fe^{+3}$ molar ratio sufficient to produce the water-soluble iron complex, wherein substantially all iron present in the reaction medium is introduced into the reaction medium in the form of $Fe^{+3}$.

36. A method for producing a water-soluble, negatively charged iron complex, the method comprising the step of reacting a ferric source with a sulfate source in an aqueous reaction medium at a pH and $SO_4^{-2}$ to $Fe^{+3}$ molar ratio sufficient to produce the water-soluble, negatively charged iron complex substantially without forming any nitrogen oxide.

* * * * *

UNITED STATES PATENT AND TRADEMARK OFFICE
CERTIFICATE OF CORRECTION

PATENT NO. : 5,089,040
DATED : February 18, 1992
INVENTOR(S) : Roger A. Brown, Donald C. Young, and Alex E. Miller It is certified that error appears in the above-identified patent and that said Letters Patent is hereby corrected as shown below:

Claim 29, column 6, line 20, replace "28" with -- 27 --.

Signed and Sealed this

Sixth Day of July, 1993

Attest:

MICHAEL K. KIRK

Attesting Officer   Acting Commissioner of Patents and Trademarks